United States Patent Office 3,489,806
Patented Jan. 13, 1970

---

3,489,806
ISOPRENOID COMPOUNDS AND A PROCESS FOR PRODUCING THE SAME
Hugo Gutmann, Reinach, Roman Marbet, Riehen, and Ulrich Schwieter, Reinach, Switzerland, assignors to Hoffmann-La Roche Inc., Nutley, N.J., a corporation of New Jersey
No Drawing. Filed Jan. 19, 1967, Ser. No. 610,218
Int. Cl. C07c *43/14*
U.S. Cl. 260—615                                              2 Claims

---

ABSTRACT OF THE DISCLOSURE

Aliphatic isoprenoid compounds having two terminal ether linkages and compounds produced by hydrolysis, acylation, hydrogenation, and oxidation of said isoprenoid compounds including processes for producing these compounds. The isoprenoid compound is produced by reacting an ether of 3-methyl-pent-3-en-1-yne with an alkyl ether of 2-methyl-acrolein. These compounds are intermediates in the production of $C_{20}$ dialdehyde pigments.

---

BACKGROUND OF THE INVENTION

This invention relates to intermediates useful in the production of $C_{20}$ dialdehyde pigments which are utilized as coloring agents for such materials as foodstuffs, pharmaceuticals, and cosmetics. This invention also relates to the production of these valuable intermediates.

SUMMARY OF THE INVENTION

The present invention is concerned with isoprenoid compounds of the general formula:

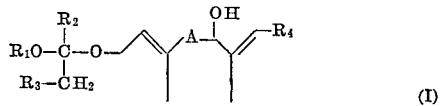

(I)

in which A signifies —CH=CH— and —C≡C—; $R_1$ signifies alkyl; $R_2$ and $R_3$ signify hydrogen or alkyl, or $R_1$ and $R_3$, taken together, represent a trimethylene bridge, and $R_4$ signifies alkoxy, and the hydrolysis, acylation and oxidation products of these compounds, as well as a process for manufacturing these compounds.

The substituents specified in Formula I as alkyl residues are preferably lower alkyl radicals with from 1 to 4 carbon atoms such as methyl, ethyl, isopropyl. The alkoxy groups also are particularly lower alkoxy radicals with from 1 to 4 carbon atoms such as methoxy, ethoxy, isopropoxy.

The process for preparing compounds of Formula I above in accordance with the invention is characterized in that an ether compound of the general formula:

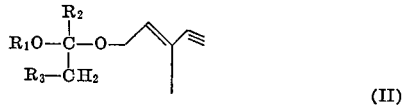

(II)

in which $R_1$, $R_2$ and $R_3$ have the significance given above, is condensed in a solvent with an aldehyde of the general formula:

(III)

in which $R_4$ has the significance given above, in the presence of or in contact with alkali or alkaline earth amide. The compound of Formula I above, so-formed, can then be subjected to an acidic hydrolysis, if desired. The hydroxyl group which is set free by the hydrolysis can then be acylated, if desired. The triple bond is partially hydrogenated if desired and the formyl group oxidized if desired.

Of the products of Formula I and the compounds manufacturable therefrom by subsequent reactions, the following are especially valuable:

1-ethoxy-8-(1-methoxy-1-methylethoxy)-2,6-dimethyl-octa-1,6-dien-4-yn-3-ol
2,6-dimethyl-8-hydroxyocta-2,4,6-trien-1-al
2,6-dimethyl-8-hydroxyocta-2,4,6-trien-1-oic acid
2,6-dimethyl-8-acyloxyocta-2,6-dien-4-yn-1-al
2,6-dimethyl-8-acyloxyocta-2,4,6-trien-1-al
2,6-dimethyl-8-hydroxyocta-2,6-dien-4-yn-1-oic acid.

All of these products are useful intermediates in the preparation of e.g. polyene dialdehydes and polyene dicarboxylic acid esters belonging to a group of carotinoid pigments which are especially suitable for coloring foodstuffs, pharmaceutical and cosmetic preparations. E.g. can 1-ethoxy-8-(1-methoxy-1-methylethoxy)-2,6-dimethyl-octa-1,6-dien-3-ol,
2,6-dimethyl-8-hydroxyocta-2,4,6-trien-1-al,
2,6-dimethyl-8-acyloxyocta-2,6-dien-4-yn-1-al or
2,6-dimethyl-8-acyloxyocta-2,4,6-trien-1-al be processed to yield 2,6,11,15-tetramethylhexadeca-2,4,6,8,10,12,14-heptaen-1,16-dial, a $C_{20}$ dialdehyde; whereas the 2,6-dimethyl-8-hydroxyocta-2,4,6-trien-1-oic acid, or the 2,6-dimethyl-8-hydroxyocta-2,6-dien-4-yn-1-oic acid can be processed to yield a di(lower alkyl)-2,6,11,15-tetramethyl - hexadeca - 2,4,6,8,10,12,14 - heptaen - 1,16-dioate, a $C_{20}$ diester. The mentioned $C_{20}$ compounds are valuable as color pigments in foodstuffs, cosmetic and pharmaceutical preparations.

DETAILED DESCRIPTION

The acetal or ketal of 3-methylpent-2-en-4-yn-1-ol (Formula II) employable as the starting compound in the process in accordance with the invention can exist in cis- or trans-form or also consist of a mixture of both forms. Isopropenyl ether has been found to be especially suitable as the acetalization agent. The hydroxyl group can, however, also be protected by acetalization with another enol ether; for example, with vinyl ether, propenyl ether or dihydropyran. The acetalization is preferably undertaken in the presence of an acidic agent (e.g., in the presence of p-toluenesulfonic acid), expediently within a temperature range lying below room temperature.

The 3-alkoxy-2-methylacrolein (Formula III) usable as the condensation component can, for example, exist as the methyl or, preferably, the ethyl derivative.

The linkage of the compounds of Formulae II and III to produce the compounds of Formula I above is carried out in accordance with this invention in the presence of an alkali metal or alkaline earth metal amide. Any conventional alkali metal or alkaline earth metal of an amine can be utilized in accordance with this invention. Of the alkali amides, lithium amide is especially suitable as a condensation agent in accordance with this invention. Of the alkaline earth amides, calcium amide is particularly suitable as a condensation agent in accordance with this invention. Also, the amides of sodium, especially when the sodium contains small amounts of magnesium, are useful condensation aides in accordance with this invention.

Of the amines which react with the alkali and alkaline earth metals with the formation of an amide, ammonia is preferred. However, the mono- and disubstituted amines deriving from ammonia (for example, methylamine, diethylamine, N-methylaniline) are just as suitable for the formation of the condensation-promoting amide.

Any conventional solvent can be utilized in accordance with this invention for the compounds of Formulae II and III. Typical solvents which can be utilized in carrying out the condensation reaction include ethyl ether, isopropyl ether, diethylene glycol, dimethyl ether, tetrahydrofuran, dioxane, morpholine, etc.

Furthermore, it is preferred to utilize a solvent in the condensation reaction which is identical with the amine component of the metal amide employed in the reaction. An especially suitable solvent is ammonia, when using, for example, lithium amide or N-methylaniline with, for example, N-sodio-N-methylaniline as the condensation aide.

In carrying out the condensation reaction, it is preferably to utilize about 1 mol of the compound of Formula II above per mol of the compound of Formula III above. If desired, a molar excess of the compounds of Formula II above or the compounds of Formula III above can be utilized. The condensation reaction can be preferably carried out at room temperature, if desired. However, higher or lower temperatures can be utilized, if desired.

During the condensation reaction, the compounds of Formula I above are produced in the form of the corresponding alkali or alkaline earth metal salt. Due to the presence of the alkali or alkaline earth metal amide, these alkali or alkaline earth metal salts can be converted into the corresponding hydroxy compound by treatment with a suitable acid such as an aliphatic carboxylic acid or salt thereof. Typical compounds which can be utilized for this treatment include acetic acid, concentrated aqueous ammonium chloride or ammonium acetate.

The compounds of Formula I wherein A is —C≡C— produced by this condensation reaction can, if desired, be partially hydrogenated so that the acetylene linkage is reduced to an ethylene linkage.

The compounds of Formula I obtained in this manner can be modified by hydrolysis, hydrogenation, acylation and oxidation, by means of the following reaction scheme:

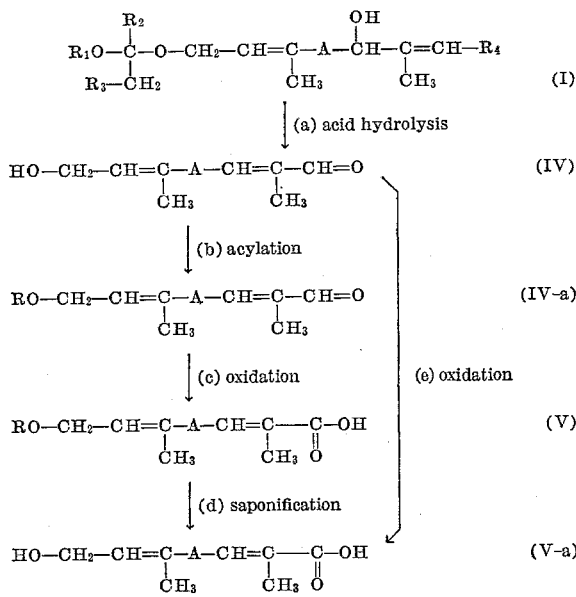

wherein $R_1$, $R_2$, $R_3$, and $R_4$ are as defined above and R is an acyl radical having from 1 to 6 carbon atoms and A is as above.

The conversion of compounds of Formula I to compounds of Formula IV can be carried out by any conventional hydrolysis reaction utilizing a dilute mineral acid as the hydrolyzing agent. Typical acid hydrolyzing agents include dilute aqueous solutions of sulfuric acid, hydrochloric acid, etc. This hydrolysis reaction can be carried out, if desired, at room temperature. However, higher or lower temperatures can also be utilized with great efficacy.

As seen from the foregoing reaction scheme, the hydrolysis reaction converts the ether linkage at the 8-carbon of the compounds of Formula I to a hydroxy group while converting the ether linkage at the 1-carbon position of the compounds of Formula I above to an aldehyde linkage. Furthermore, the hydroxy group is removed from the third carbon atom of the compounds of Formula I while the double bond at the 1- and 2-positions in the compounds of Formula I above is shifted to the 3- and 4-positions.

The hydroxy group in the compounds of Formula IV can, if desired, be acylated by treatment with a conventional acylating agent in the presence of an organic solvent. Typical acylating agents which can be utilized in accordance with this invention include acetyl chloride, benzoyl chloride, acetic anhydride, etc. This reaction can be carried out at room temperature. In this manner, the hydroxy group of Formula IV is protected during the subsequent oxidation reaction in step (c). In carrying out the acylation reaction, reduced or elevated temperatures can be utilized, if desired.

Any conventional oxidation technique can be utilized to oxidize the compounds of Formula IV–a to Formula V. A method of oxidation which can be utilized in accordance with this invention comprises treating compounds of Formula IV–a above with an oxidizing agent in the presence of an inorganic solvent. Typical oxidizing agents which can be utilized in this reaction include silver oxide, potassium dichromate, chromium trioxide, etc. These oxidation reactions are generally carried out in the presence of an inert organic solvent such as the organic solvents mentioned hereinabove. In carrying out the reaction, temperature and pressure are not critical and the reaction can be carried out at room temperature and atmospheric pressure or at elevated temperature and reduced pressure.

The oxidation can also be regulated to include the concomitant saponification of the acyl groups R. This is conveniently expedited by the use of silver oxide as oxidant working substantially as described above.

Any conventional saponification agent can be utilized to convert the compounds of Formula V above to the 3-hydroxy compounds of Formula V–a. Typical saponification agents which can be utilized include alkali metal or alkaline earth metal hydroxides. In carrying out the saponification, the alkali and alkaline earth metal hydroxides can be added in the form of an aqueous solution or in an inert organic solvent. In carrying out this saponification, temperature and pressure are not critical and the reaction can be carried out at room temperature and atmospheric pressure or at elevated temperatures and reduced pressure.

Compounds of Formula IV can also be directly oxidized to compounds of Formula V–a. A convenient oxidizing agent for this purpose is e.g. silver oxide which can be applied under conditions substantially as described for the reaction IVa→V hereinabove. Thus, the silver oxide converts the aldehyde group of the compounds of Formula IV into a carboxy group without thereby attacking the hydroxy group thereof.

Where A is —C≡C—, the reduction reaction can be carried out at any step during the aforementioned reaction scheme, if desired. The reduction of the acetylene linkages in any one of Formulae I, IV, IV–a and V and V–a can be effected by catalytic hydrogenation in the presence of a catalyst which selectively reduces only the triple bond (ethynylenic linkage). For example, these compounds can be catalytically hydrogenated in an inert solvent such as ethyl acetate, toluene, or petroleum ether in the presence of a selective hydrogenation catalyst, e.g., a palladium lead catalyst in the presence of quinoline of the type disclosed in the publication Helv. Chim. Acta, 35, 446 (1952).

The compounds of Formulae IV and IV-a above are valuable starting materials for the synthesis of polyene dialdehyde of the formula:

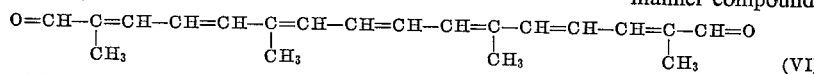

(VI)

which is especially suitable as pigments for coloring foodstuffs, pharmaceutical and cosmetic preparations giving a yellow-orange color.

The compounds IV and IV-a can be easily converted into compounds of Formula VI by means of the following reaction scheme:

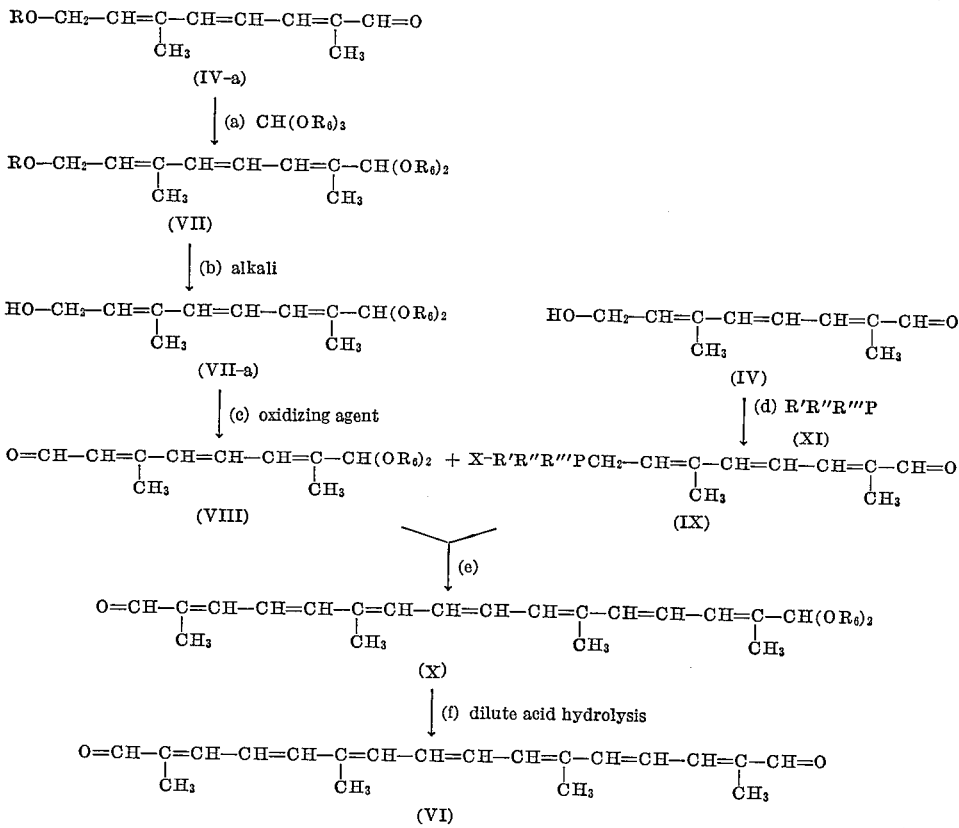

wherein R is as defined above; $R_6$ is a lower alkyl radical containing from 1 to 7 carbon atoms; R′, R″ and R‴ are aryl radicals containing from 6 to 16 carbon atoms or aralkyl radicals containing from 7 to 16 carbon atoms or a lower alkyl radical containing from 1 to 7 carbon atoms; and X is an anion of a mineral acid, e.g., hydrochloric, sulfuric, or hydrobromic acid.

The conversion of compounds of Formula IV-a into compounds of Formula VIII above is carried out by first hydrolyzing the ester linkage in the compounds of Formula IV-a above to form the hydroxy compound of Formula VII-a above, which is oxidized to the aldehyde of Formula VIII. During this procedure, the aldehyde group in Formula IV-a above is protected during the oxidizing step (c) by means of its being converted to an acetal group, such as in Formula VII, any time before oxidation.

Compounds of Formula IV above are converted into compounds of the Formula IX above by reacting the hydroxy group with the compounds of Formula IV above with a phosphine compound as in step (d) to produce a compound of Formula IX. In carrying out the reaction of step (d), compounds of Formula IV are reacted with a phosphine of the Formula XI in the presence of an inert solvent (such as, for example, a lower alkanol such as methanol or ethanol) in the presence of a proton donor or with an acid addition salt of the phosphine of Formula XI or a diarylmonoalkyl phosphine. Proton donors which can be employed in the above process include organic acids such as hydrohalic acids or sulfuric acid. In this manner compounds of Formula IX are formed.

Compounds of Formula IX and compounds of Formula VIII can be reacted as in step (e) to form the $C_{20}$ compounds of Formula X. This reaction is preferably carried out in the presence of a solvent, i.e., an organic solvent substantially inert to the reactants such as a lower alkanol solvent, i.e., methanol, ethanol, etc., dimethylformamide, acetonitrile or benzene. The preferred solvents are methanol and benzene. The reaction is conducted in the presence of a strong base, such as an alkali metal hydride, e.g., sodium hydride, potassium hydride, an alkali metal amide, e.g., sodium amide, alkali metal-lower alkoxide, preferably sodium methoxide, or a solution of an alkali metal hydroxide in a lower alkanol, e.g., KOH in methanol. This reaction can be carried out at room temperature. However, temperatures as high as the reflux temperature of the solvent or as low as the freezing point of the solvent can be effectively employed.

The compounds of Formula V and V-a above are valuable starting materials for the synthesis of polyene diesters which are especially valuable as pigments for coloring foodstuffs, pharmaceutical and cosmetic preparations. A representative member of said polyene diesters is diethyl 2,6,11,15-tetramethylhexadeca - 2,4,6,8,10,12,14-heptaen-1,16-dioate (crocetin diethyl ester) which imparts a canary yellow tint to the object to be colored. A typical embodiment of the process of preparing this compound originating from a compound of Formula V-a is described in Example 11.

The following examples are illustrative.

EXAMPLE 1

175 g. of crude 5-(1-methoxy-1 - methylethoxy) - 3-methylpent-3-en-1-yne are introduced in a rapid stream into a solution of lithium amide in liquid ammonia.

The ammonia-alkaline lithium amide solution can be manufactured as follows:

0.5 g. of finely divided lithium are introduced with stirring into 600 ml. of liquid ammonia. After the addition of 0.5 g. of iron (III) nitrate, compressed air is led into the solution for a few seconds. As soon as the blue color of the solution has disappeared, a further 7.1 g. of finely divided lithium are added. The evaporating ammonia is condensed in a condenser charged with acetone/Dry Ice and led back to the reaction mixture. The mixture is stirred until the blue color disappears (15 to 60 minutes). The dark clear reaction solution is stirred for 90 minutes, then treated with 170 ml. of dry toluene and immediately subsequently with 114 g. of 3-ethoxy-2-methylacrolein in a rapid stream and further stirred for 30 minutes. The mixture is subsequently neutralized by the addition of 80 ml. of glacial acetic acid in 200 ml. of toluene. The acid solution is conveniently added through a dropping funnel of which the exit tube dips into the reaction mixture. The ammonia is evaporated off, with stirring, until the temperature in the reaction vessel has risen to 40° C. The toluene is subsequently distilled off under reduced pressure. The residual 1-ethoxy-8-(1-methoxy-1-methylethoxy)-2,6-dimethyl-octa-1,6-dien-4-yn-3-ol is a light-brown oil. U.V. maximum (in ethanol); 228 m$\mu$; $\epsilon=18,000$; $n_D{}^{20}=1.5120$; $d=1.002$.

The 5-(1-methoxymethylethoxy)-3-methylpent-3-en-1-yne employed as starting compound can be manufactured as follows:

96 g. of 3-methylpent-2-en-4-yn-1-ol are, after the addition of 0.5 ml. of 10 percent methyl alcoholic p-toluenesulfonic acid, treated with stirring and cooling at 5 to 15° C. with 79 g. of isopropenyl methyl ether. The acetal is not isolated, but further processed directly.

EXAMPLE 2

175 g. of crude 5-(1-methoxy-1-methylethoxy)-3-methylpent-3-en-1-yne are introduced in a rapid stream into a solution of calcium amide in liquid ammonia.

The ammonia-alkaline calcium amide solution can be manufactured according to the data of Example 1 as follows:

40 g. of calcium are dissolved in 1200 ml. of liquid ammonia and, after the addition of 0.5 g. if iron (III) nitrate, stirred until, after about 1 hour, the blue color has disappeared. The dark, clear reaction solution is stirred for a further 90 minutes at the boiling temperature of the ammonia, then treated with 170 ml. of toluene and 114 g. of 3-ethoxy-2-methylacrolein and further stirred for 60 minutes. The mixture is subsequently neutralized by the addition of 160 ml. of glacial acetic acid in 200 ml. of toluene and, as set forth in Example 1, worked up. The 1-ethoxy-8-(1-methoxy-1-methylethoxy)-2,6-dimethylocta-1,6-dien-4-yn-3-ol is a yellow-brown colored oil. U.V. maximum (in ethanol) 227–228 m$\mu$; $\epsilon=17,500$.

EXAMPLE 3

23 g. of sodium, 133 ml. of N-methylaniline, 100 ml. of tetrahydrofuran and 150 ml. of xylene are gassed with nitrogen with the exclusion of moisture, heated under reflux conditions to 140° C. and treated with vigorous stirring within 1 hour with a mixture of 60 ml. of styrene and 150 ml. of xylene. The reaction mixture is subsequently stirred at 140° C. for a further hour, until the sodium has completely gone into solution. After the addition of 400 ml. of tetrahydrofuran, 175 g. of 5-(1-methoxy-1-methylethoxy)-3-methylpent-3-en-1-yne are introduced at 0 to 10° C. into the sodium/methylaniline solution obtained. The reaction mixture is diluted with 400 ml. of tetrahydrofuran, cooled to −30° C. and treated with 114 g. of 3-ethoxy-2-methylacrolein. The mixture, becoming mobile, is stirred at −30° C. for 45 minutes, thereupon neutralized at this temperature by the addition of 65 ml. of glacial acetic acid and treated with 200 ml. of water in order to redissolve the precipitating sodium acetate. The aqueous phase is separated and discarded. The organic phase is evaporated under reduced pressure until the tetrahydrofuran is removed from the reaction mixture. The residual xylene solution is successively washed with water and a solution of 100 g. of sulfuric acid in 700 ml. of water, warmed to 20 to 25° C. and, after the addition of 350 ml. of methanol and 50 ml. of 2 percent sulfuric acid, stirred for 60 minutes. The neutral solution is washed with 400 ml. of 10 percent aqueous sodium sulfate solution, as well as with 400 ml. of 5 percent aqueous sodium hydrogen carbonate solution. The reaction mixture is subsequently concentrated under reduced pressure until 100 ml. of xylene have distilled over, diluted with 180 ml. of pyridine, cooled to 0 to 10° C., treated with a solution of 85 ml. of acetyl chloride in 100 ml. of xylene and stirred at room temperature for 30 minutes. The organic phase which separates out after the addition of 200 ml. of water is separated and successively washed with 300 ml. of 10 percent aqueous sulfuric acid, 400 ml. of water and 200 ml. of water. The aqueous phase is shaken out twice with 50 ml. of toluene each time. The organic extracts are subsequently combined and evaporated under reduced pressure. The residual crude 2,6-dimethyl-8-acetoxyocta-2,6-dien-4-yn-1-al can be purified by distillation. The pure compound boils at 118 to 130° C./0.02–0.04 torr. and melts at 35 to 37° C.

EXAMPLE 4

270 g. of 1-ethoxy-8-(1-methoxy-1-methylethoxy)-2,6-dimethylocta-1,6-dien-4-yn-3-ol are dissolved in 400 ml. of toluene and, with cooling and strong stirring, treated with 50 ml. of 2 percent sulfuric acid and 50 ml. of methanol, in doing which the temperature should not exceed 25° C. The reaction mixture is subsequently stirred at 20 to 25° C. with nitrogen gassing for 2 hours. The toluene phase is separated, washed with 400 ml. of a 10 percent aqueous sodium sulfate solution and subsequently with 400 ml. of a 5 percent sodium hydrogen carbonate solution. The aqueous phases are separated and once more shaken out with 100 ml. of toluene. The combined toluene extracts are concentrated at 50° C. to a volume of 400 ml. The 2,6-dimethyl-8-hydroxyocta-2,6-dien-4-yn-1-al dissolved in toluene can be acylated without isolation as described hereinafter. The toluene solution can also be completely evaporated and the residue crystallized from dibutyl ether. The 2,6-dimethyl-8-hydroxyocta-2,6-dien-4-yn-1-al thus obtained melts at 32–34° C.

EXAMPLE 5

The 2,6-dimethyl-8-hydroxyocta-2,6-dien-4-yn-1-al dissolved in toluene obtained according to Example 4 is, after the addition of 180 ml. of pyridine, treated with stirring at 0 to 10° C. with 85 ml. of acetyl chloride in 100 ml. of toluene. After completion of the treatment, the reaction mixture is stirred at 20 to 25° C. for 30 minutes and subsequently thoroughly shaken with 200 ml. of water. The toluene phase is separated and successively washed at 20 to 25° C. with 300 ml. of 10 percent aqueous sulfuric acid, 400 ml. of water and 200 ml. of water. The aqueous phase is separated and again shaken out twice with 50 ml. of toluene each time. The combined toluene solutions are evaporated under reduced pressure at 60° C. The residual crude 2,6-dimethyl-8-acetoxyocta-2,6-dien-4-yn-1-al can be purified by distillation in high vacuum. The forerun going over at up to about 100° C. (external temperature 120° C., internal pressure 0.03 torr.) consists chiefly of 3-methyl-5-acetoxypent-3-en-1-yne. The pure 2,6-dimethyl-8-acetoxyocta-2,6-dien-4-yn-1-al melts at 36 to 37° C.

EXAMPLE 6

5.0 g. of 2,6-dimethyl-8-acetoxyocta-2,6-dien-4-yn-1-al are dissolved in 30 ml. of toluene and, after the addition of 0.4 g. of palladium/calcium carbonate catalyst deactivated by addition of lead and quinoline hydrogenated up to the uptake of 1.05 equivalents of hydrogen. The reaction solution, after separation of the catalyst, is successively washed with 0.5 N sulfuric acid, potassium hydrogen carbonate solution and water, then dried over sodium sulfate and treated with a solution of 0.02 g. of iodine in 2 ml. of toluene. The solution is allowed to stand at room temperature for 18 hours and is subsequently successively washed with a 5 percent sodium thiosulfate solution and water, then dried over sodium sulfate and evaporated under reduced pressure. The residual 2,6-dimethyl-8-acetoxyocta-2,4,6-trien-1-al melts at 70 to 72° C. after recrystallization from ethyl ether/petroleum ether (boiling range 30 to 40° C.).

EXAMPLE 7

In an analogous manner, according to the data of Example 6, 2,6-dimethyl-8-hydroxyocta-2,6-dien-4-yn-1-al can be converted by partial hydrogenation into 2,6-dimethyl-8-hydroxyocta-2,4,6-trien-al-1.

EXAMPLE 8

A solution of 8.93 g. of silver nitrate in 3.0 ml. of water is combined in one pouring with a solution of 5.16 g. of sodium hydroxide in 7.8 ml. of water. To this oxidation solution, there are added dropwise with stirring within 20 minutes 4.0 g. of 2,6-dimethyl-8-hydroxyocta-2,4,6-trien-1-al in 19 ml. of ethanol. In doing so, the temperature is held between 35 and 45° C. The reaction mixture is restirred for a further 15 minutes and then filtered. The filtrate is concentrated to about 40 ml. under reduced pressure and washed twice with ether. The aqueous phase is separated and acidified with 30 ml. of 3 N sulfuric acid. The 2,6-dimethyl - 8 - hydroxyocta-2,4,6-trien-1-oic acid which separates out in the cold is filtered off, washed with water and dried over potassium hydroxide. Melting point 165–168° C. U.V. absorption maximum (in ethanol) 298 m$\mu$; $\epsilon$=42,000.

EXAMPLE 9

A solution of 9.0 g. of silver nitrate in 30 ml. of water is combined in one pouring with a solution of 5.2 g. of sodium hydroxide in 7.8 ml. of water. To this oxidation solution, there are added dropwise with stirring within 10 minutes 5.0 g. of 2,6-dimethyl-8-acetoxyocta-2,6-dien-4-yn-1-al in 19 ml. of ethanol. The temperature is held at 35 to 45° C. After complete addition, the reaction mixture is further stirred for 15 minutes and worked up as described in Example 8. The 2,6-dimethyl-8-hydroxyocta-2,6-dien-4-yn-1-oic acid formed melts at 106 to 108° C. U.V. absorption maximum (in ethanol) 292 m$\mu$; $\epsilon$=20,000.

EXAMPLE 10

Preparation of 2,6,11,15-tetramethyl-hexadeca-2,4,6,8,10,12,14-heptaene-1, 16-dial [C$_{20}$ dialdehyde] [yellow-orange pigment]

(A) PREPARATION OF 8,8-DIMETHOXY-3,7-DIMETHYL-OCTA-2,4,6-TRIEN-1-AL

All trans 8,8-dimethoxy-3,7-dimethyl-octa-2,4,6-trien-1-al can be manufactured in an advantageous manner as follows:

71 g. of 8-acetoxy-2,6-dimethyl-octa-2,4,6-trien-1-al prepared in accordance with Example 6 are suspended in 15 ml. of methanol and 41 ml. of orthoformic acid trimethyl ester and, after the addition of 3.5 ml. of a 1 percent solution of p-toluenesulfonic acid in methanol, stirred at 20–25° C. for 4 hours. The acetoxy acetal [absorption maximum (in petroleum ether) 276 m$\mu$] present in the clear solution is not isolated but is directly alkaline-saponified. A solution of 37.7 g. of sodium hydroxide in 34 ml. of water and 180 ml. of methanol is added dropwise thereto with stirring at 0–5° C. within 20 minutes. The reaction mixture is further stirred at 5–10° C. for 15 minutes, immediately thereafter poured into 2.5 liters of ice cold 5 percent by weight potassium hydrogen carbonate solution and extracted twice with ether (500 and 800 ml.). The ether phase is washed twice with fresh potassium hydrogen carbonate solution and dried over potassium carbonate.

The hydroxy acetal [absorption maximum (in petroleum ether) 276 m$\mu$] containing ether solution is subsequently treated with 300 g. of manganese dioxide and stirred or shaken at 10° C. for 60 hours, then filtered and evaporated. The residual oil is taken up in 10 ml. of petroleum ether (boiling range 40–45° C.) and cooled in the ice bath for 6 hours. The orange-yellow all trans 8,8-dimethoxy-3,7-dimethyl-octa-2,4,6-trien-1-al crystallizing out melts at 57–58° C. after recrystallization from petroleum ether: absorption maxima (in petroleum ether) 300 (shoulder), 313, 327 m$\mu$;

$$E^{1\ \text{percent}}_{1\ \text{cm.}} = 1380,\ 2000,\ 1780.$$

(B) PREPARATION OF [3,7-DIMETHYL-8-OXO-OCTA-2,4,6-TRIEN-YL]-TRIPHENYL-PHOSPHONIUM BROMIDE

A mixture of 10.5 ml. of dimethylformamide and 45 ml. of methylene chloride is treated with stirring at −20° C., with 6.5 ml. of phosphorous tribromide and thereupon within 20 minutes with a solution of 16.6 g. of 8-hydroxy-2,6-dimethyl-octa-2,4,6-trien-1-al prepared in accordance with Example 7 in 25 ml. of methylene chloride. The reaction mixture is stirred at −10° C. for 1 hour, then poured into ice water and extracted with 300 ml. of ether. The ether extract is washed twice with ice water, three times with ice cold 10 percent potassium hydrogen carbonate solution and twice with ice water, briefly dried over sodium sulfate and immediately evaporated under reduced pressure at 20° C. The residual 8-bromo-2,6-dimethyl-octa-2,4,6-trien-1-al crystallizes after trituration with a little ether. Melting point 68–70° C.; absorption maximum (in petroleum ether) 311 m$\mu$. Without further purification, the unstable compound is immediately dissolved in 50 ml. of methylene chloride and treated with 26 g. of triphenylphosphine. In doing so, the solution warms up to boiling. After 1 to 1½ hours, 200 ml. of acetic acid ethyl ester are slowly added while scratching with a glass rod. The [3,7-dimethyl-8-oxo-octa-2,4,6-trien-yl]-triphenyl-phosphonium bromide crystallizing out is filtered off in the cold after standing for 12 hours. Melting point 203–205° C.; absorption maximum (in ethanol) 315 m$\mu$;

$$E^{1\ \text{percent}}_{1\ \text{cm.}} = 970.$$

(C) PREPARATION OF DIALDEHYDE 60 g. of [3,7-dimethyl-8-oxo-octa-2,4,6-trien-yl]-triphenyl-phosphonium bromide in 160 ml. of absolute methanol are treated with 20 ml. of orthoformic acid trimethyl ester and a solution of 0.1 g. of p-toluenesulfonic acid and 0.1 ml. of 85 percent phosphoric acid in 20 ml. of absolute methanol and allowed to stand at room temperature for 18 hours. The reaction mixture is thereafter treated with 2 ml. of pyridine and subsequently simultaneously with a solution of 21 g. of 8,8-dimethoxy-3,7-dimethyl-octa-2,4,6-trien-1-al in 100 ml. of absolute benzene and a sodium methylate solution from 4 g. of sodium and 50 ml. of absolute methanol. The mixture is heated at 50° C. for 4 hours, then cooled and, after the addition of 70 g. of ice, partitioned between petroleum ether (boiling range 40 to 45° C.) and 85 percent methanol. The petroleum ether phase is washed several times with water, dried and evaporated. The residual crude 1,1,16,16-tetramethoxy-2,6,11,15-tetramethyl-hexadeca-2,4,6,8,10,12,14-heptaene is dissolved in 300 ml. of acetone and, after the addition of 15 ml. of 1 N sulfuric acid, heated to boiling for 30 minutes. The 2,6,11,15 - tetramethyl - hexadeca - 2,4,6,8,10,12,14 - heptaene-1,16-dial which separates out melts at 190–191° C. after recrystallization from acetic acid ethyl ester; violet, metalically shining leaflets; absorption maxima (in chloroform) 267, 455, 483 m$\mu$;

$$E^{1\ \text{percent}}_{1\ \text{cm.}} = 580,\ 3970,\ 3840.$$

EXAMPLE 11

Preparation of diethyl 2,6,11,15-tetramethyl-hexadeca-2,4,6,8,10,12,14-heptaene-1,16-dioate (crocetin diethyl ester; $C_{20}$ diester) [yellow pigment]

In a manner analogous to the data of Example 6 2,6-dimethyl-8 - hydroxy - octa - 2,6 - dien-4-yn-1-oic acid can be converted by partial hydrogenation to 2,6-dimethyl-8-hydroxy-octa-2,4,6-trien-1-oic acid.

10 g. of 2,6-dimethyl-8-hydroxy-octa-2,4,6-trien-1-oic acid, 21 g. of tris-(2-hydroxypropyl)-amine and 12.7 g. of diethyl sulfate are boiled under reflux conditions in 30 ml. of acetone for 2 hours. After cooling the reaction mixture is diluted with ether and the etheral solution successively washed with 3 N hydrochloric acid, potassium hydrogen carbonate and water, dried with sodium sulfate and evaporated to dryness. The obtained, crude ethyl 2,6 - dimethyl-8-hydroxy-octa-2,4,6-trien-1-oate shows a U.V. absorption maximum (in ethanol) at 301 m$\mu$ $$(E^1_{1\ cm.}\ \text{percent} = 1450)$$

This product is further processed without additional purification. A sample thereof can be purified by distillation under reduced pressure and recrystallization from isopropyl ether to yield a product which shows a U.V. absorption maximum (in petroleum ether) at 295 m$\mu$ $$(E^1_{1\ cm.}\ \text{percent} = 1755)$$

and melts at ca. 20° C.

To a mixture of 350 g. of crude ethyl 8-hydroxy-2,6-dimethyl-octa-2,4,6-trien-1-oate, 600 ml. of petroleum ether, 1000 ml. of absolute ether and 2.4 ml. of absolute pyridine is added at —5° C. while stirring in the course of 40 minutes a solution of 61 ml. phosphorous tribromide in 240 ml. of petroleum ether. The resulting, light yellow solution is stirred for 20 minutes at —5° C., poured onto ice water and extracted with ether. The ether solution is washed 3 times with water, once with 5% sodium hydrogen carbonate solution and once with water. Ethyl 8-bromo-2,6-dimethyl-octa-2,4,6-trien-1-oate is obtained as a yellow oil which soon crystallizes. This compound can be recrystallized from petroleum ether to yield a product which melts at 53–55° C.; U.V. absorption maximum at 305 m$\mu$ $$(E^1_{1\ cm.}\ \text{percent} = 1610)$$

In a 2 l., four-necked flask, furnished with a Vigreux column and descending cooler 615 g. of triethyl phosphite are heated. With stirring 900 g. of crude ethyl 8-bromo-2,6-dimethyl-octa-2,4,6-trien-1-oate are added dropwise in such a manner that the steam temperature in the Vigreux column does not exceed 60–70° C. After the addition has been terminated the column is heated to 150° C. until only little distillate goes over. About 350 g. of ethyl bromide, contaminated with some triethyl phosphite, is distilled over. The residue is distilled in a normal distillation apparatus, yielding ethyl 8-diethoxyphosphinyl-2,6-dimethyl-octa-2,4,6-trien-1-oate.

A solution of 280 g. of crude ethyl 8-hydroxy-2,6-dimethyl-octa-2,4,6-trien-1-oate in 500 ml. of absolute ether is added to a suspension of 430 g. of manganese dioxide in 600 ml. of absolute ether with stirring at 5° C. in the course of 20 minutes. The mixture is stirred 40 hours at 20° C., whereby after 16, 22 and 28 hours there are added three portions of 140 g. of manganese dioxide each. The manganese dioxide is filtered off and washed with several portions of ether. The filtrate is evaporated and the crystalline residue recrystallized from isopropyl ether. Ethyl 2,6-dimethyl-8-oxo-octa-2,4,6-triene-1-oate is obtained as light yellow crystals with melting point 76–77° C.; U.V. absorption maximum at 316, 330 m$\mu$ $$(E^1_{1\ cm.}\ \text{percent} = 2280, 1980)$$

8.8 g. of ethyl 2,6-dimethyl-8-oxo-octa-2,4,6-triene-1-oate and 14 g. of ethyl 8-diethoxyphosphinyl-2,6-dimethyl-octa-2,4,6-triene-1-oate are dissolved in 60 ml. of absolute ethanol. 1.22 g. of sodium in 60 ml. of absolute ethanol are slowly added dropwise, whereby the reaction solution evolves slight heat and the product starts to separate. The mixture is stirred for 3 hours at 35–45° C. The dark suspension is evaporated under reduced pressure, diluted with water, neutralized and extracted with methylene chloride. The methylene chloride extract is washed with water, dried and evaporated. The semi-crystalline residue is recrystallized from benzene, yielding diethyl 2,6,11,15 - tetramethyl - hexadeca - 2,4,6,8,10,12,14 - heptaene-1,16-dioate (crocetin diethyl ester) as red crystals, which melt at 218–219° C. Absorption maxima at 257, 412, 434, 462 m$\mu$ $$(E^1_{1\ cm.}\ \text{percent} = 415, 2190, 3365, 3200)$$

What is claimed is:
1. An isoprenoid compound of the formula:

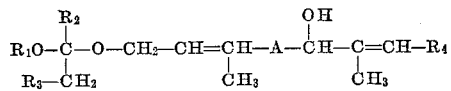

wherein A is selected from the group consisting of —CH=CH— and —C≡C—; $R_1$ represents a lower alkyl radical; $R_2$ and $R_3$ represent a radical selected from the group consisting of hydrogen and lower alkyl; and $R_4$ represents a lower alkoxy radical.

2. The isoprenoid compound of claim 1 wherein said compound is 1-ethoxy-8-(1-methoxy-1-methylethoxy)-2,6-dimethylocta-1,6-diene-4-yn-3-ol.

References Cited

UNITED STATES PATENTS

| | | |
|---|---|---|
| 2,106,180 | 1/1938 | Kreimeier. |
| 2,106,181 | 1/1938 | Kreimeier. |
| 2,676,992 | 4/1954 | Humphlett. |
| 2,780,658 | 2/1957 | Surmatis. |
| 2,797,234 | 6/1957 | Birbiglia et al. |
| 2,815,379 | 12/1957 | Surmatis. |
| 2,815,380 | 12/1957 | Surmatis. |
| 2,824,041 | 2/1958 | Bavley et al. |

LEON ZITVER, Primary Examiner

HOWARD T. MARS, Assistant Examiner

U.S. Cl. X.R.

260—602, 483, 345.9, 413, 405, 611, 485, 410, 606.5